(12) United States Patent
Marsella

(10) Patent No.: US 7,798,359 B1
(45) Date of Patent: Sep. 21, 2010

(54) HEAT-SEALED, PEELABLE LIDDING MEMBRANE FOR RETORT PACKAGING

(75) Inventor: Louis J. Marsella, Reno, NV (US)

(73) Assignee: Momar Industries LLC, Northbrook, IL (US)

( * ) Notice: Subject to any disclaimer, the term of this patent is extended or adjusted under 35 U.S.C. 154(b) by 329 days.

(21) Appl. No.: 11/191,881

(22) Filed: Jul. 28, 2005

Related U.S. Application Data

(60) Provisional application No. 60/602,391, filed on Aug. 17, 2004.

(51) Int. Cl.
  *B65D 41/00* (2006.01)
(52) U.S. Cl. .................. 220/359.3; 220/359.2; 215/232
(58) Field of Classification Search ................ 215/13.1, 215/DIG. 2, 305, 295; 220/359.4, 359.3, 220/359.2, 359.1, FOR. 186; *B65D 77/20*
  See application file for complete search history.

(56) References Cited

U.S. PATENT DOCUMENTS

| | | | |
|---|---|---|---|
| 1,346,112 A | 7/1920 | Bruns | |
| 1,556,020 A | 10/1925 | Noll | |
| 1,910,913 A | 5/1933 | Conner | |
| 1,916,977 A | 7/1933 | Gutmann | |
| 1,937,492 A | 11/1933 | Merolle | |
| 1,961,033 A | 5/1934 | Bricks | |
| 1,995,350 A | 3/1935 | Hoag | |
| 2,039,757 A | 5/1936 | Von Till | |
| 2,085,934 A | 7/1937 | Von Till | |
| 2,188,946 A | 2/1940 | Gutmann | |
| 2,242,256 A * | 5/1941 | McManus | 215/328 |
| 2,312,513 A | 3/1943 | Wilson | |
| 2,620,939 A | 12/1952 | Weisgerber | |
| 2,643,021 A * | 6/1953 | Freedman | 220/592.16 |
| 2,670,869 A | 3/1954 | Martin | |
| 2,681,742 A | 6/1954 | Miller | |
| 2,686,606 A | 8/1954 | Froitzheim | |
| 2,686,607 A | 8/1954 | Froitzheim | |
| 2,748,969 A | 6/1956 | Leary | |
| 2,904,837 A | 9/1959 | Crabbe | |
| 2,929,525 A * | 3/1960 | Glover et al. | 215/12.2 |
| 3,143,364 A * | 8/1964 | Klein | 285/55 |
| 3,169,656 A | 2/1965 | Wieckmann | |
| 3,186,209 A | 6/1965 | Friedman | |
| 3,189,209 A | 6/1965 | Owens | |
| 3,224,617 A | 12/1965 | Hohl | |
| 3,245,857 A * | 4/1966 | Rutledge | 156/281 |
| 3,255,907 A | 6/1966 | Eddy | |
| 3,266,658 A | 8/1966 | Meissner | |
| 3,331,523 A | 7/1967 | Exton | |

(Continued)

FOREIGN PATENT DOCUMENTS

CA   2572379   12/2006

(Continued)

*Primary Examiner*—Anthony Stashick
*Assistant Examiner*—Robert J Hicks
(74) *Attorney, Agent, or Firm*—Chad D. Bruggeman; John F. Salazar; Middleton Reutlinger

(57) ABSTRACT

Heat-sealed, peelable lidding membrane for retort packaging. The membrane includes a plastic layer laminated to a foil layer with a first adhesive layer. A co-extruded layer is laminated to the foil layer with a second adhesive layer. The co-extruded layer is formed with a plastic body co-extruded with a heat-sealable sealing resin layer.

35 Claims, 3 Drawing Sheets

U.S. PATENT DOCUMENTS

| | | | |
|---|---|---|---|
| 3,360,149 A | 12/1967 | Roth | |
| 3,501,042 A | 3/1970 | Risch | |
| 3,527,372 A | 9/1970 | Manning | |
| 3,530,917 A * | 9/1970 | Donovan | 220/359.1 |
| 3,547,294 A * | 12/1970 | Williams | 215/12.2 |
| 3,612,325 A | 10/1971 | Williams | |
| 3,632,004 A | 1/1972 | Grimes et al. | |
| 3,788,510 A | 1/1974 | Collins | |
| 3,815,314 A | 6/1974 | Pollock et al. | |
| 3,823,182 A | 7/1974 | Nonaka et al. | |
| 3,845,525 A | 11/1974 | Gaylord | |
| 3,879,492 A | 4/1975 | Bontinick | |
| 3,910,410 A * | 10/1975 | Shaw | 220/359.3 |
| 3,917,100 A | 11/1975 | Dukess | |
| 3,923,179 A | 12/1975 | Choksi | |
| 3,923,182 A | 12/1975 | Choksi | |
| 3,923,183 A | 12/1975 | Choksi | |
| 3,923,184 A | 12/1975 | Choksi | |
| 3,923,185 A | 12/1975 | Choksi | |
| 3,944,103 A | 3/1976 | Cros | |
| 3,980,194 A | 9/1976 | Costa | |
| 4,007,848 A | 2/1977 | Snyder | |
| 4,009,793 A * | 3/1977 | Minesinger et al. | 215/246 |
| 4,013,188 A * | 3/1977 | Ray | 215/347 |
| 4,066,181 A | 1/1978 | Robinson et al. | |
| 4,076,152 A | 2/1978 | Mumford | |
| 4,091,949 A | 5/1978 | Fowles et al. | |
| 4,093,093 A | 6/1978 | Fowles et al. | |
| 4,109,815 A | 8/1978 | Collins, III | |
| 4,128,184 A | 12/1978 | Northup | |
| 4,151,924 A * | 5/1979 | Jameson | 215/347 |
| 4,181,232 A | 1/1980 | Bellamy et al. | |
| 4,204,604 A | 5/1980 | Morin et al. | |
| 4,207,990 A | 6/1980 | Weiler et al. | |
| 4,209,126 A * | 6/1980 | Elias | 229/123.2 |
| 4,266,687 A | 5/1981 | Cummings | |
| 4,275,817 A | 6/1981 | Patton | |
| 4,276,989 A | 7/1981 | Hicks | |
| 4,280,653 A | 7/1981 | Elias | |
| 4,358,919 A | 11/1982 | Hirota et al. | |
| 4,364,485 A | 12/1982 | Knapp | |
| 4,369,889 A | 1/1983 | Ostrowsky | |
| 4,378,894 A | 4/1983 | Willis et al. | |
| 4,381,840 A | 5/1983 | Ostrowsky | |
| 4,382,521 A | 5/1983 | Ostrowsky | |
| 4,392,579 A | 7/1983 | Uhlig et al. | |
| 4,423,821 A * | 1/1984 | McIntosh | 215/329 |
| 4,427,126 A | 1/1984 | Ostrowsky | |
| 4,430,288 A * | 2/1984 | Bonis | 264/510 |
| 4,434,904 A | 3/1984 | D'Amico et al. | |
| 4,457,440 A | 7/1984 | Dukess | |
| 4,473,163 A | 9/1984 | Geiger | |
| 4,493,427 A * | 1/1985 | Wolkonsky | 215/230 |
| 4,496,674 A | 1/1985 | Ehrhart et al. | |
| 4,501,371 A | 2/1985 | Smalley | |
| 4,526,279 A | 7/1985 | Weiler et al. | |
| 4,527,705 A | 7/1985 | Prades | |
| 4,564,117 A | 1/1986 | Herbert | |
| 4,576,297 A | 3/1986 | Larson | |
| 4,583,665 A | 4/1986 | Barriac | |
| 4,588,099 A * | 5/1986 | Diez | 215/232 |
| 4,625,875 A | 12/1986 | Carr et al. | |
| 4,637,519 A | 1/1987 | Dutt et al. | |
| 4,638,913 A | 1/1987 | Howe | |
| 4,643,330 A | 2/1987 | Kennedy | |
| 4,648,520 A | 3/1987 | Stull | |
| 4,651,886 A | 3/1987 | Stull | |
| 4,662,529 A | 5/1987 | Moore | |
| 4,668,458 A | 5/1987 | Whitney | |
| 4,674,642 A | 6/1987 | Towns et al. | |
| 4,674,643 A | 6/1987 | Wilde et al. | |
| 4,682,463 A | 7/1987 | Foldesi | |
| 4,683,016 A | 7/1987 | Dutt et al. | |
| 4,704,180 A * | 11/1987 | Marsella et al. | 156/324 |
| 4,705,188 A | 11/1987 | Rahn | |
| 4,706,835 A | 11/1987 | Kreiseder | |
| 4,721,215 A | 1/1988 | Bertaud | |
| 4,722,447 A | 2/1988 | Crisci | |
| 4,723,685 A | 2/1988 | Fillmore et al. | |
| 4,730,748 A * | 3/1988 | Bane | 229/103.11 |
| 4,738,370 A | 4/1988 | Urmston et al. | |
| 4,747,500 A | 5/1988 | Gach et al. | |
| 4,747,502 A | 5/1988 | Luenser | |
| 4,754,890 A * | 7/1988 | Ullman et al. | 215/232 |
| 4,754,892 A | 7/1988 | Retief | |
| 4,757,914 A * | 7/1988 | Roth et al. | 220/359.2 |
| 4,764,403 A * | 8/1988 | Ajmera | 428/36.7 |
| 4,778,698 A | 10/1988 | Ou-Yang | |
| 4,779,750 A | 10/1988 | Armstrong | |
| 4,782,968 A | 11/1988 | Hayes | |
| 4,801,037 A | 1/1989 | Hayashida et al. | |
| 4,807,745 A * | 2/1989 | Langley et al. | 206/245 |
| 4,807,770 A | 2/1989 | Barriac | |
| 4,809,858 A | 3/1989 | Ochs | |
| 4,810,541 A * | 3/1989 | Newman et al. | 428/36.7 |
| 4,815,617 A | 3/1989 | Cullum | |
| 4,818,577 A | 4/1989 | Ou-Yang | |
| 4,842,951 A | 6/1989 | Yamada et al. | |
| 4,846,359 A * | 7/1989 | Baird et al. | 215/12.2 |
| 4,875,594 A | 10/1989 | Ochs | |
| 4,879,147 A * | 11/1989 | Newman et al. | 428/36.4 |
| 4,881,649 A | 11/1989 | Hsu et al. | |
| 4,892,911 A * | 1/1990 | Genske | 525/240 |
| 4,893,718 A | 1/1990 | Delespaul et al. | |
| 4,894,266 A | 1/1990 | Bauer et al. | |
| 4,896,783 A | 1/1990 | Leoncavallo et al. | |
| 4,935,273 A | 6/1990 | Ou-Yang | |
| 4,981,229 A | 1/1991 | Lanham | |
| 4,981,230 A | 1/1991 | Marshall et al. | |
| 4,991,731 A | 2/1991 | Osip et al. | |
| 4,997,097 A | 3/1991 | Krautkramer | |
| 5,002,811 A | 3/1991 | Bauer et al. | |
| 5,006,384 A | 4/1991 | Genske | |
| 5,007,546 A | 4/1991 | Rose et al. | |
| 5,009,323 A | 4/1991 | Montgomery et al. | |
| 5,009,324 A | 4/1991 | Ochs | |
| 5,011,719 A | 4/1991 | Gehrke et al. | |
| 5,012,946 A | 5/1991 | McCarthy | |
| 5,023,121 A | 6/1991 | Pockat et al. | |
| 5,031,787 A | 7/1991 | Ochs | |
| 5,058,755 A | 10/1991 | Hayes | |
| 5,061,532 A | 10/1991 | Yamada | |
| 5,069,355 A | 12/1991 | Matuszak | |
| 5,071,686 A | 12/1991 | Genske et al. | |
| 5,078,290 A | 1/1992 | Ochs | |
| 5,092,469 A | 3/1992 | Takata et al. | |
| 5,093,164 A | 3/1992 | Bauer et al. | |
| 5,110,642 A | 5/1992 | Genske | |
| 5,135,125 A * | 8/1992 | Andel et al. | 215/399 |
| 5,151,317 A | 9/1992 | Bothe | |
| 5,160,767 A | 11/1992 | Genske et al. | |
| 5,175,035 A | 12/1992 | Pinsolle et al. | |
| 5,176,271 A | 1/1993 | Painchaud et al. | |
| 5,178,293 A | 1/1993 | Suzuki et al. | |
| 5,197,618 A * | 3/1993 | Goth | 215/232 |
| 5,197,620 A | 3/1993 | Gregory | |
| 5,197,621 A | 3/1993 | Bartl et al. | |
| 5,255,813 A | 10/1993 | Berggren et al. | |
| 5,258,191 A | 11/1993 | Hayes | |
| 5,259,522 A | 11/1993 | Morton | |
| 5,265,745 A * | 11/1993 | Pereyra et al. | 215/232 |
| 5,302,442 A | 4/1994 | O'Brien et al. | |
| 5,342,684 A * | 8/1994 | Carespodi | 428/347 |
| 5,346,082 A | 9/1994 | Ochs et al. | |

| | | | |
|---|---|---|---|
| 5,381,913 A * | 1/1995 | Peeters | 215/232 |
| 5,407,751 A * | 4/1995 | Genske et al. | 428/516 |
| 5,415,306 A | 5/1995 | Luch et al. | |
| 5,421,470 A | 6/1995 | Dudzik | |
| 5,433,992 A | 7/1995 | Galda et al. | |
| 5,447,792 A | 9/1995 | Brandt et al. | |
| 5,469,968 A * | 11/1995 | Matthews et al. | 206/532 |
| 5,492,757 A * | 2/1996 | Schuhmann et al. | 428/329 |
| 5,500,265 A | 3/1996 | Ambroise et al. | |
| 5,513,781 A | 5/1996 | Ullrich et al. | |
| 5,523,136 A * | 6/1996 | Fischer et al. | 428/35.2 |
| 5,533,622 A | 7/1996 | Stockley, III et al. | |
| 5,551,608 A | 9/1996 | Moore et al. | |
| 5,615,789 A | 4/1997 | Finkelstein et al. | |
| 5,626,929 A | 5/1997 | Stevenson | |
| 5,664,694 A | 9/1997 | Bietzer et al. | |
| 5,685,443 A | 11/1997 | Taber et al. | |
| 5,702,015 A | 12/1997 | Giles et al. | |
| 5,720,401 A | 2/1998 | Moore | |
| 5,723,507 A | 3/1998 | Markovich et al. | |
| 5,738,231 A | 4/1998 | Montgomery | |
| 5,756,178 A | 5/1998 | Obadia | |
| 5,773,136 A | 6/1998 | Alder et al. | |
| 5,785,195 A | 7/1998 | Zwemer et al. | |
| 5,788,101 A | 8/1998 | King | |
| 5,837,369 A | 11/1998 | Grunberger et al. | |
| 5,850,951 A | 12/1998 | Hayes | |
| 5,851,640 A | 12/1998 | Schuhmann et al. | |
| 5,860,544 A * | 1/1999 | Brucker | 215/232 |
| 5,862,928 A | 1/1999 | Breuer et al. | |
| 5,875,909 A | 3/1999 | Guglielmini | |
| 5,882,789 A * | 3/1999 | Jones et al. | 428/349 |
| 5,884,788 A | 3/1999 | Wilde | |
| 5,902,075 A | 5/1999 | Krings | |
| 5,915,577 A * | 6/1999 | Levine | 215/232 |
| 5,925,430 A | 7/1999 | Bayer et al. | |
| 5,927,530 A | 7/1999 | Moore | |
| 5,929,128 A | 7/1999 | Whetten et al. | |
| 5,947,311 A | 9/1999 | Gregory | |
| 5,973,077 A | 10/1999 | Kan et al. | |
| 5,992,661 A | 11/1999 | Zumbuhl et al. | |
| 5,997,968 A | 12/1999 | Dries et al. | |
| 6,006,930 A | 12/1999 | Dreyer et al. | |
| 6,044,994 A | 4/2000 | Miller | |
| 6,056,136 A | 5/2000 | Taber et al. | |
| 6,056,141 A * | 5/2000 | Navarini et al. | 220/269 |
| 6,068,933 A * | 5/2000 | Shepard et al. | 428/474.4 |
| 6,082,566 A * | 7/2000 | Yousif et al. | 215/232 |
| 6,082,568 A | 7/2000 | Flanagan | |
| 6,089,390 A | 7/2000 | Druitt et al. | |
| 6,105,800 A | 8/2000 | Czesak | |
| 6,119,422 A * | 9/2000 | Clear et al. | 52/309.8 |
| 6,119,883 A | 9/2000 | Hock et al. | |
| 6,123,212 A | 9/2000 | Russell et al. | |
| 6,152,316 A | 11/2000 | Niese | |
| 6,152,319 A | 11/2000 | Kamachi et al. | |
| 6,158,604 A | 12/2000 | Larguia, Sr. et al. | |
| 6,165,576 A * | 12/2000 | Freedman et al. | 428/36.91 |
| 6,179,139 B1 | 1/2001 | Heilman | |
| 6,202,871 B1 | 3/2001 | Kelly | |
| 6,206,871 B1 | 3/2001 | Zanon et al. | |
| 6,220,466 B1 | 4/2001 | Hayes et al. | |
| 6,231,975 B1 | 5/2001 | Kong et al. | |
| 6,234,338 B1 | 5/2001 | Searle | |
| 6,235,822 B1 | 5/2001 | Whetten et al. | |
| 6,237,789 B1 | 5/2001 | Zhu | |
| 6,239,210 B1 * | 5/2001 | Kim et al. | 524/538 |
| 6,253,939 B1 | 7/2001 | Wan et al. | |
| 6,253,940 B1 | 7/2001 | Graham et al. | |
| 6,257,430 B1 | 7/2001 | Rinnie et al. | |
| 6,265,083 B1 | 7/2001 | Tanizaki et al. | |
| 6,276,543 B1 | 8/2001 | German et al. | |
| 6,277,478 B1 | 8/2001 | Kurita et al. | |
| 6,302,321 B1 * | 10/2001 | Reese et al. | 229/123.1 |
| 6,315,140 B1 | 11/2001 | Nadel | |
| 6,382,443 B1 | 5/2002 | Gregory | |
| 6,382,445 B1 | 5/2002 | McCandless | |
| 6,419,101 B1 | 7/2002 | Hessel et al. | |
| 6,477,823 B1 | 11/2002 | Kitterman et al. | |
| 6,488,165 B1 | 12/2002 | Hidding | |
| 6,502,710 B1 | 1/2003 | Bosl et al. | |
| 6,659,297 B2 | 12/2003 | Gregory et al. | |
| 6,848,590 B2 | 2/2005 | Brozell et al. | |
| 6,854,614 B2 | 2/2005 | Sprick | |
| 6,874,647 B2 | 4/2005 | Bloom et al. | |
| 6,893,672 B2 * | 5/2005 | Ingraham | 426/107 |
| 6,902,075 B2 | 6/2005 | O'Brien et al. | |
| 6,913,157 B2 | 7/2005 | Oh | |
| 6,948,630 B2 | 9/2005 | Julian et al. | |
| 7,004,340 B2 | 2/2006 | Belden, Jr. | |
| 7,021,478 B1 | 4/2006 | Hock | |
| 7,168,581 B2 | 1/2007 | Robinson et al. | |
| 7,175,039 B2 | 2/2007 | German et al. | |
| 7,217,454 B2 | 5/2007 | Smelko et al. | |
| 2001/0012868 A1 * | 8/2001 | Chen et al. | 524/539 |
| 2002/0027123 A1 | 3/2002 | Druitt et al. | |
| 2002/0066713 A1 | 6/2002 | Ma | |
| 2002/0162818 A1 | 11/2002 | Williams | |
| 2003/0071007 A1 | 4/2003 | Ma et al. | |
| 2003/0098285 A1 | 5/2003 | Gregory et al. | |
| 2003/0116524 A1 | 6/2003 | Robinson et al. | |
| 2003/0150833 A1 | 8/2003 | Shenkar | |
| 2004/0055992 A1 | 3/2004 | Robinson et al. | |
| 2004/0173944 A1 * | 9/2004 | Mueller et al. | 264/495 |
| 2005/0003125 A1 * | 1/2005 | Barber et al. | 428/36.7 |
| 2005/0048233 A1 * | 3/2005 | Nomula | 428/34.7 |
| 2005/0077297 A1 * | 4/2005 | Marshburn et al. | 220/359.2 |
| 2005/0077298 A1 * | 4/2005 | Nomula | 220/359.2 |
| 2005/0129969 A1 * | 6/2005 | Schell et al. | 428/516 |
| 2005/0211657 A1 | 9/2005 | Mallet et al. | |
| 2005/0242097 A1 * | 11/2005 | Morin | 220/359.4 |
| 2005/0284837 A1 | 12/2005 | Taber et al. | |
| 2007/0125785 A1 | 6/2007 | Robinson et al. | |
| 2007/0138125 A1 | 6/2007 | Granger | |
| 2007/0187352 A1 | 8/2007 | Kras et al. | |

FOREIGN PATENT DOCUMENTS

| | | | |
|---|---|---|---|
| DE | 3237634 A1 * | 4/1984 | |
| DE | 4206244 | 9/1993 | |
| EP | 160978 A2 * | 11/1985 | |
| EP | 207626 A2 * | 1/1987 | |
| EP | 0269920 | 6/1988 | |
| EP | 275102 A2 * | 7/1988 | |
| EP | 324260 A2 * | 7/1989 | |
| EP | 405365 A1 * | 1/1991 | |
| EP | 0421821 | 4/1991 | |
| EP | 589033 B1 * | 3/1998 | |
| GB | 2034288 | 6/1980 | |
| GB | 2130574 A * | 6/1984 | |
| JP | 01058675 A * | 3/1989 | |
| JP | 01240463 A * | 9/1989 | |
| JP | 01308772 A * | 12/1989 | |
| JP | 02205574 A * | 8/1990 | |
| JP | 02219769 A * | 9/1990 | |
| JP | 2000052982 A * | 2/2000 | |
| JP | 2001261054 | 9/2001 | |
| JP | 2006027621 A * | 2/2006 | |
| JP | 2006044743 A * | 2/2006 | |
| JP | 2006052004 A * | 2/2006 | |
| WO | 9009935 | 9/1990 | |
| WO | WO-2006002922 | 1/2006 | |
| WO | WO-2007042205 | 4/2007 | |

\* cited by examiner

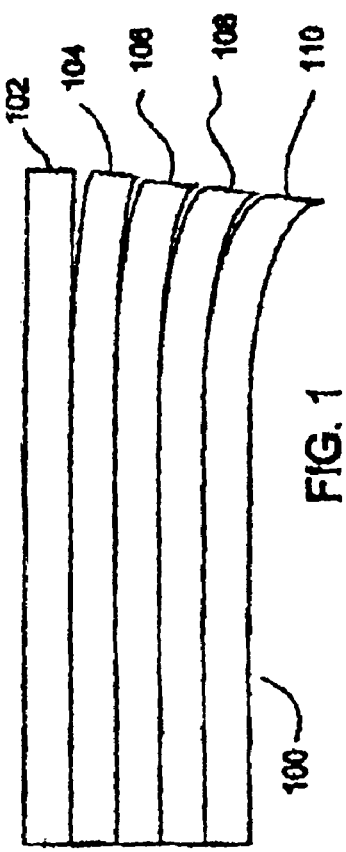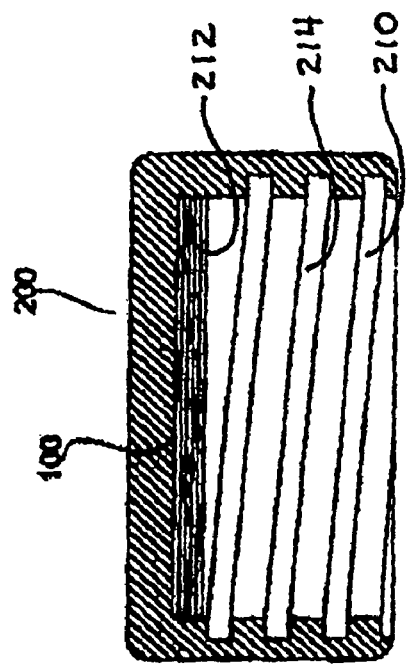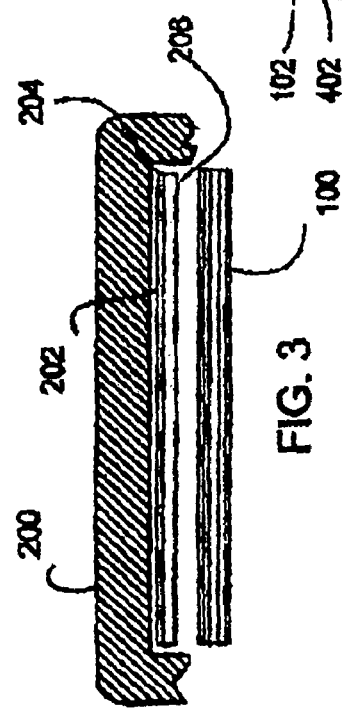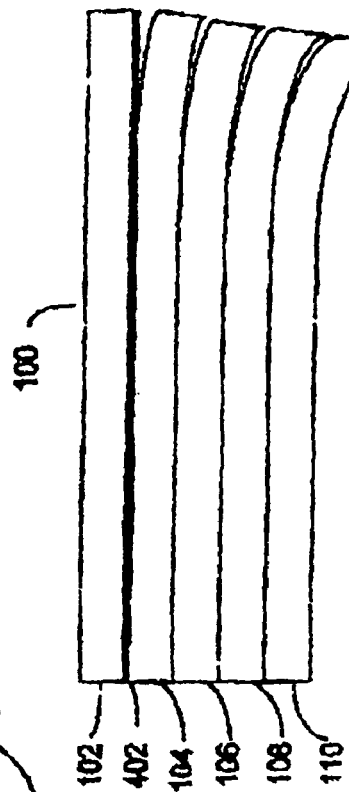

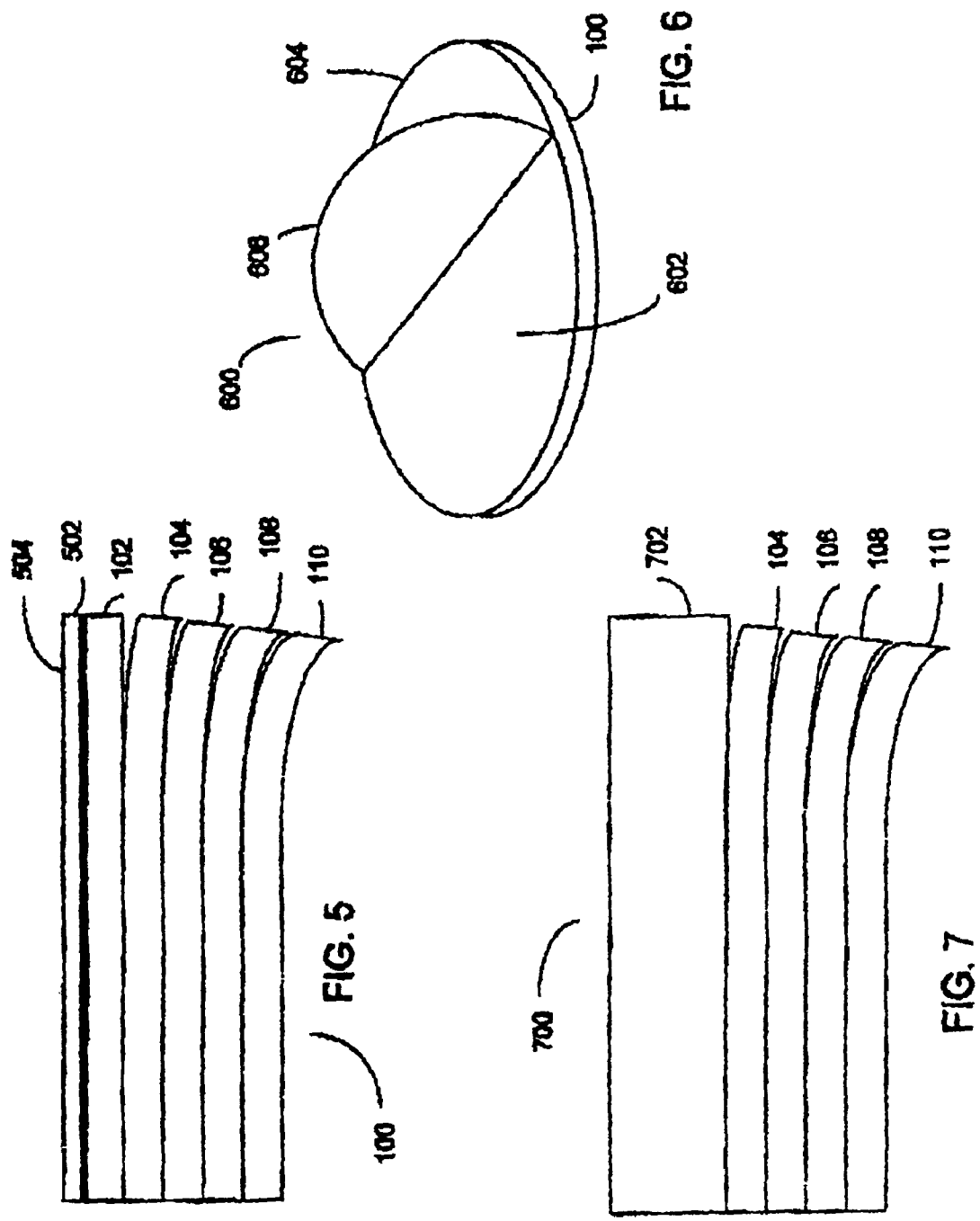

HEAT-SEALED, PEELABLE LIDDING MEMBRANE FOR RETORT PACKAGING

CROSS REFERENCE TO RELATED APPLICATION

This application is a utility patent application and claims benefit under 35 USC §119(e) and priority to provisional patent application No. 60/602,391 filed Aug. 17, 2004.

FIELD OF THE INVENTION

One or more aspects of the invention relate generally to package sealing lidstock and more particularly, to a novel heat-sealed, peelable lidding membrane for use in high temperature retortable packaging.

BACKGROUND OF THE INVENTION

Packaged foodstuffs, medicines, and the like can be contaminated during processing. Accordingly, they are often treated subsequent to the packaging operation to reduce spoilage. For some products which are especially susceptible to spoilage, these processes include sterilization, pasteurization, and the like. These processes are often performed in retorts under elevated conditions of heat and temperature for specified, often prolonged periods of time.

Where it is desirable to provide packaging in the form of rigid containers, it is often desirable to seal the package with a membrane or film. This membrane serves several purposes. It prevents tampering and pilfering of the container's contents. It assures continued cleanliness of the container's interior as well as the contents therein. Moreover, it can prevent gases, such as oxygen, from entering the package. Finally, it can serve as a label to identify and market the manufacturer's product.

One commonly practiced method for implementing such a sealing membrane is to provide one surface thereof with a sealing resin which can be adhered to the rigid container during processing. Such resins must be approved for direct food contact. The membrane is bonded to a rim about an opening on the container by activating the resin, often by means of heat. One methodology for providing this bonding heat is by induction sealing.

Induction sealing is generally performed by an inductive coil inside a sealing apparatus. The coil creates an electromagnetic field when it is energized by an electric current. The electromagnetic field causes an aluminum foil layer disposed in the lidstock to heat. This heating causes a resin coating, generally applied to the foil, to melt and adhere to the lip or rim of the container opening, thereby forming a seal between the lidstock and the container. When the container leaves the electromagnetic field, the foil cools, and the seal between the lidstock and the container is completed.

Early closure membranes required the user to cut into the membrane to open the container. For reasons of consumer convenience, it is now often desirable that such membranes be readily peelable from the container in order to provide access to the material stored therein. Examples of such implementations include, but are not limited to, dietary supplements, single serving convenience foods, and the like.

The foregoing examples of peelable lidstock membranes further illustrate a problem with existing technology. Where a peelable lidstock is utilized to package many foodstuffs, including adult dietary supplements, baby formula, and the like, an especially high degree of seal reliability is required. This is due to the fact that many such foodstuffs serve as excellent culture media for spoilage and pathological microorganisms, and infants and the elderly generally have lessened resistance to infection. To ensure that a healthy product is produced, many such foodstuffs are heat-treated in retorts subsequent to filling and sealing. With existing technologies, the heat used in retorting the packaged product often leads to softening of the sealing resins with concomitant loss of seal integrity and higher seal failures. In at least one application, the maximum acceptable failure rate is three failures per million containers.

A further problem with existing retortable lidding membranes is the removal thereof from the containers to which they are applied. The typically encountered induction sealed membrane is often substantially equal in form and size to the container to which it is applied, and is generally not substantially larger than that outer diameter. Accordingly, it is usually somewhat awkward to remove such membranes, as there is often no substantial "handle", or removal feature, to remove the membrane.

One possible solution to this latter problem was the development of asymmetrical membranes, where the asymmetry provided a tab which extended substantially beyond the rim of the container, providing the requisite "handle" for removal of the membrane. An example of this methodology is the use of oval membranes over round openings. The problem with using this methodology in induction sealed membranes is that the induction energy used during the sealing process tends to follow the rim of the foil and not along the mass of the container rim. Accordingly, the energy available for sealing is substantially diminished at the container/seal juncture in the region of the asymmetry. While not wishing to be bound by theory, it is believed that this leads to increased seal failures at the region of asymmetry, with concomitant increases in product leakage and spoilage.

Accordingly, it would be desirable and useful to provide a heat-sealable, peelable lidding membrane suitable for retort packaging.

It would be further desirable and useful to provide a heat-sealable, peelable lidding membrane suitable for retort packaging which incorporates an easy removal feature therewith.

SUMMARY OF THE INVENTION

It is an object of the present invention to provide a peelable seal for a container including a plurality of layers bonded or laminated together.

It is another object of the present invention to provide a peelable seal for a container which withstands retort packaging without damage to the seal.

It is also an object of the present invention to provide a heat-sealed, peelable lidding membrane of laminated construction wherein the bond and the construction is both chemical and mechanical through heat, co-extrusion or conduction/induction seal.

It a further object of the present invention to provide a heat-sealed, peelable lidding membrane of laminated construction wherein the topmost layer is made of material that has the strength and thickness such that it will tear before it separates from an adjacent layer.

It is even a further object of the present invention to provide a heat-sealed, peelable lidding membrane of laminated construction so that when subjected to retort packaging the membrane does not tear nor delaminate under retort processing.

It is even another object of the present invention to provide a heat-sealed, peelable lidding membrane which is weak enough to be peelable but strong enough to survive retort processing.

More particularly, the present invention is a heat-sealed, peelable lidding membrane that is subjected to retort packaging wherein the membrane includes a top layer, preferably a plastic layer, laminated to a foil layer with a first adhesive. A co-extruded layer is laminated to the foil layer with a second adhesive, the co-extruded layer having a plastic body co-extruded with a heat-sealable sealing resin layer.

Even more particularly, the present invention is a heat-sealed, peelable lidding membrane for sterilizable packaging including a sealant layer structure wherein the sealant layer structure is bondable to a container lip with a strength sufficient to allow the sealant layer to remain with the container when the seal is peeled free. The sealant layer is also capable of tearing at the periphery of the container lip when the seal is peeled free. A sealant layer backup structure is also provided which is co-extrusion bonded to the sealant layer with a strength sufficient to fracture the sealant layer at or near the periphery of the container lip during peeling of the complete membrane and delaminates from the sealant layer adjacent the container sealing lip. The sealant layer backup structure has a tear resistance sufficient to achieve the fracture and delamination and is comprised of one or more layers which may be co-extrusion or adhesive bonded together.

BRIEF DESCRIPTION OF THE DRAWINGS

The accompanying drawings show exemplary embodiments in accordance with one or more aspects of the invention; however, the accompanying drawings should not be taken to limit the invention to the embodiments shown, but are for explanation and understanding only.

FIG. 1 is a sectional diagram depicting an exemplary embodiment of a heat-sealable membrane.

FIG. 2 is a sectional diagram depicting a heat-sealable membrane arrayed within a container cap.

FIG. 3 is a sectional diagram depicting the employment of a heat-sealable membrane and a cap seal within a container cap.

FIGS. 4 and 5 are sectional diagrams respectively depicting alternate exemplary embodiments of a heat-sealable membrane, including a printable surface.

FIG. 6 is a perspective diagram depicting an exemplary embodiment of a heat-sealable membrane incorporating a removal feature.

FIG. 7 is a sectional diagram depicting an exemplary embodiment of a heat-sealable membrane incorporating another removal feature.

DETAILED DESCRIPTION OF THE DRAWINGS

Figure 8:
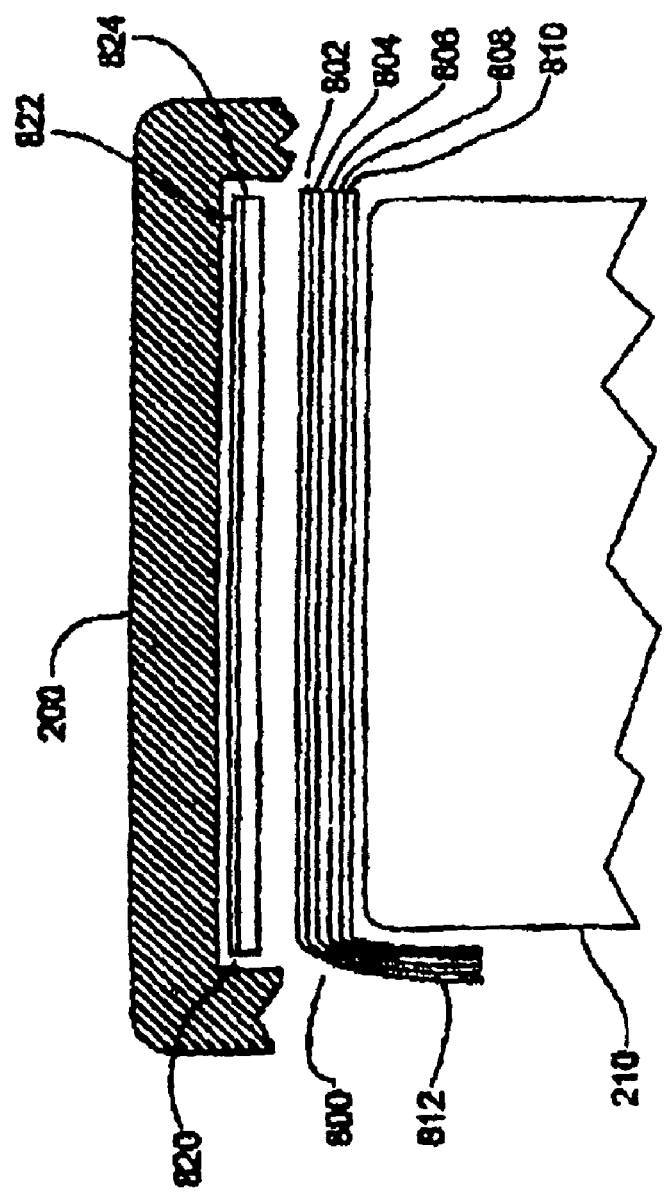
FIG. 8 is a sectional diagram depicting the employment of a heat-sealable membrane incorporating an alternate removal feature and a cap seal within a container cap.

FIG. 1 is a sectional diagram depicting one preferred embodiment of a heat-sealable membrane 100 of the present invention. In this embodiment, membrane 100 includes a first layer 102 formed of polyethylene terephthalate (PET) or polyester laminated with a first adhesive layer 104 to a foil layer 106. This laminate is subsequently laminated with a second adhesive layer 108 to a co-extruded polyethylene/copolymer, preferably a linear medium density polyethylene/copolymer sealant film as indicated by the numeral 110, sometimes referred to herein as co-ex layer 110. Co-ex layer 110 is described in further detail below.

In this preferred embodiment, layer 102 may be implemented as a 100-200 gauge (PET) or polyester layer laminated with a solventless or waterbase or solvent-based first adhesive 104 to a 1.0 to 2.0 mil aluminum foil layer 106. A preferred adhesive is a polyurethane based adhesive cured with an isocyanate based curing agent. One such adhesive/curing agent pair found to be suitable is Liofol® UR2780-US cured with Liofol® UR5891-US curing agent, available from Liofol Company, 407 Gregson Drive, Cary, N.C. These components are mixed in the ratio of five parts adhesive to one part curing agent. The mixed adhesive may be diluted with a solvent to provide a desired coat weight. Such solvents for this particular adhesive include, but are not necessarily limited to ethyl acetate, acetone, and methyl ethyl ketone. In one embodiment, a diluted adhesive includes 62% adhesive base, 13% curing agent, and 25% acetone. Conventionally, water-based adhesives have been used for lidstock membranes involving direct food contact; however, such water-based adhesives may lack laminate integrity thereby negatively impacting seal reliability. In contrast, this embodiment employs a solvent-based adhesive that improves seal reliability over that afforded by conventional water-based adhesives. Though a particular solvent-based adhesive is disclosed herein, other known solvent-based adhesives may be used. Moreover, adhesives other than solvent-based adhesives may be used if they provide sufficient seal reliability after being subjected to retort processing.

Laminating equipment is used to apply an adhesive, such as a diluted adhesive, to PET layer 102 at a dry coat weight of 2 to 3 lbs per ream. The use of adhesive at normal weights found in the sealing industry was found to provide inadequate lamination reliability between the several layers of membrane 100. This dry coat weight is in excess of conventional dry coat weights. Solvent content may be modified as required to attain this coat weight. Various PET or polyester films are formed with at least one side treated to improve adhesion. Where layer 102 is so formed, adhesive 104 is applied to that side. Similarly, aluminum foil is often formed with one polished side and one side which has a matte finish. Where foil layer 106 is provided with at least one polished side, that side is laminated facing the PET or polyester layer 102 when used in retortable packaging.

While a membrane may be formed in a number of temperature applications regimes, in one embodiment, lamination was conducted at 40° to 50° C. Alternative lamination temperatures may be employed. Subsequent to this first lamination step, a curing step may be used. In one embodiment, the laminate roll is removed from the laminating equipment and cured at a temperature of approximately 5° to 10° C. above ambient temperature for a period of approximately three weeks.

Figure 9:
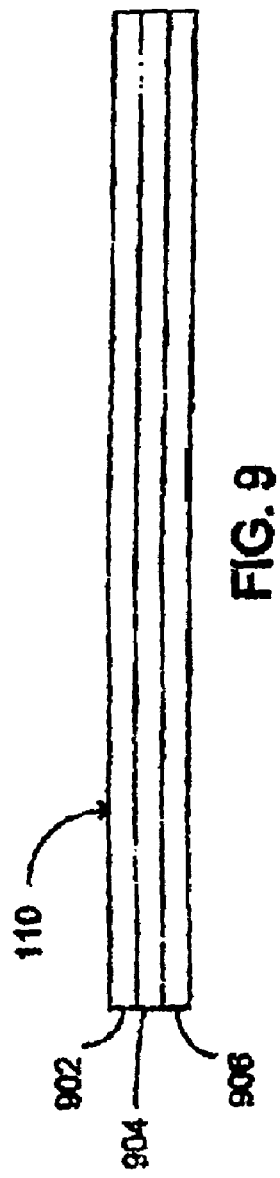
FIG. 9 is a sectional diagram depicting a co-extruded layer.

Co-ex layer 110 is a polyethylene film, preferably a linear medium-density polyethylene co-extruded with a combination of propylene and/or ethylene co-polymer resins. Having reference now to FIG. 9, in another embodiment, co-ex layer 110 is formed by co-extruding a medium-density polyethylene (MDPE), preferably a linear medium-density polyethylene (LMDPE) stratum 902 in contact with a low density polyethylene (LDPE) stratum 904, which is in turn in contact with a different polypropylene containing sealing resin layer 906. Desirable characteristics for sealing resin layer 906 are high softness and low modulus, ability to permanently bond to the container lip material, ability to be extrusion bonded to layer 904 with sufficient strength to withstand retort but weak enough to be separated from a peel force of 2-6 lbs. after retort and with a high melt flow. Extrusion bonding or co-extrusion, as it is often referred to, involves melting and squirting out two different materials against one another normally achieving a weak or strong, mechanical or chemical bond between the two, depending upon the similarities between the materials and the temperatures, pressures or other process conditions. When membrane 100 is peeled from the rim of the container to which it is applied, not shown in FIG. 9, co-ex layer 110 has unique cohesive strengths such that it de-laminates at the juncture between stratum 904 and stratum 906 above the container sealing land, and stratum 906. Fractures at the periphery of the sealing land so that a minimum amount is visible to the consumer as strata 902 and 904 are removed from stratum 906. Alternatively, the sealant may be colored to leave a visible evidence to show a seal has been achieved or it might be colored to the same general color as the bottle to hide any discoloration in the bottle lip. This de-lamination layer also serves to seal over any layers in the bottle for instant regrind, barrier layers or adhesive layers in multi-layered containers. This delicate de-laminate/fracture balance characteristic is provided by preciously manipulating the layers and exact materials and thicknesses based on the container material, the closure clamping forces, and the specific retort conditions such as temperatures and pressures which are to be expected. While the principles enumerated herein contemplate the use of a number of combinations of appropriate resins to form co-ex layer 110, in one embodiment, the polyethylene or preferably LMDPE stratum 902 is formed of Dowlex® 2038 blended with Dow LDPE 501I, and LDPE is formed of Dow LDPE 501I. Dow LDPE resins are available from The Dow Chemical Company, 2030 Dow Center, Midland, Mich. Sealing resins stratum 906, in this embodiment, may be formed of Basell Adflex® KS 353P, or AdFlex® Q 100F available from Basell North America Inc., 912 Appleton Road, Elkton, Md. In this embodiment, co-ex layer 110 is formed with the outside of polyethylene stratum 902, preferably a LMDPE, treated to promote adhesion with adhesive 108, not shown, in FIG. 9.

Subsequent to the previously discussed first curing, the laminate roll is remounted into laminating equipment and co-ex layer 110 is laminated to foil layer 106 utilizing adhesive 108. Adhesive 108 may be the previously discussed Liofol® UR2780/UR5891 adhesive system, applied at 2 to 3 lbs, per ream dry coat weight.

After lamination, the roll of membrane is again removed from the laminating equipment and cured for a period of approximately two weeks at approximately 5°-10° C. above ambient temperature. Following the second curing, the roll of laminate membrane is ready for such forming steps as dictated by the packaging application. These steps include, but are not limited to, cutting, slitting, die-cutting, imprinting, and the like.

In one application, membrane 100 can be implemented as a part of a sealing system for sealing necked bottles or the like with screw-caps. Such an application is shown in FIGS. 2 and 3, where membrane 100 is put in contact with a cap assembly including a cap 200 and a cap seal 202. Membrane 100 is immediately adjacent cap seal 202. Cap seal 202 is typically formed in accordance with known packaging methods. In this example, cap seal 202 is formed of a polypropylene layer 204 laminated to a thermoplastic elastomer layer 206. Continuing, the above embodiment, membrane 100 is disposed over opening 212 in neck 214 of container 210 and PET or polyester layer 102 is disposed in contact with elastomer layer 206 of cap seal 202. Subsequent to the filling of the container, not shown in this illustration, cap 200 is fitted thereto, and the previously discussed induction sealing is conducted. Induction sealing heats foil layer 106, which in turn heats the sealing resins formed as part of co-ex layer 110. The heated sealing resins form a peelable seal with the rim of the container, and as induction energy is de-activated, the cooling of the sealing resins perfects the seal between peelable membrane 100 and the container rim.

Additionally, the peelable sealing membrane may have imprint images or messages on an upper surface of membrane 100. This may be effected by simply imprinting on an upper surface of PET or polyester layer 102. Alternatively, and as shown in FIG. 4, imprinting of the underside of transparent layer 102 may be completed prior to lamination, for instance, as shown by ink layer 402. A further alternative is shown in FIG. 5, where an ink layer, identifiable as 502, is formed on an upper surface of the PET or polyester layer 102, and another transparent or translucent layer 504 is laminated over layer 102. In one embodiment, layer 504 is implemented as a layer of 48 gauge PET or polyester. Again, the previously discussed Liofol® UR2780/UR5891 adhesive or the like, not shown in this illustration, may be implemented to effect the lamination of layers 102 and 504. Membrane 100 is available form Momar Industries, 645 Edison Way, Reno, Nev., as Propeel™ 502 R2S.

In another embodiment of membrane 100, a peelable sealing membrane is provided by including a removal feature. In this embodiment, a Unipac™, or Lift-n-Peel™, available from Unipac Corporation, 125 Edward Street, Aurora, Ontario, Canada, L4G 1W3 is used, an example of which is shown in FIG. 6. With continued reference to FIG. 6 and renewed reference to FIG. 1, a peelable sealing membrane 600 is described. Top-Tab™ or Lift-n-Peel™ includes a handle layer 602 laminated to an upper surface of membrane 100. The Top Tab™ or Lift-n-Peel™ may be laminated over PET or polyester layer 102, or optionally, may replace PET or polyester layer 102. Handle layer 602 is defined by two regions. Region 604 of handle layer 602 is firmly adhered to membrane 100. Region 606, while initially deployed in contact with membrane 100, is adhered thereto by a readily releasable adhesive. A user can readily lift region 606 from membrane 100, whereupon region 606 forms a convenient tab for peeling membrane 100 from the rim of a container, not shown.

An alternate removal feature is shown in FIG. 7. It will be appreciated that the aspect shown and discussed at FIG. 1 is a substantially flexible membrane. By replacing layer 102 thereof with a substantially stiff, thickened layer 702, membrane 700 may be easily removed from a container in the following manner. A user pushes upwardly on stiff layer 702 with a thumb or fingernail. Stiff layer 702 may be implemented with a number of substantially stiff materials suitable for sealing. These include papers, cardboards, plastics, composites thereof, and the like. In this embodiment, layer 702 is formed of a 10 mil. layer of talc-filled polypropylene in place of layer 102. The substantially stiff nature of layer 702 causes membrane 700 itself to act as a lever, and thereby easily peelable from the rim of the container, not shown, to which it is sealed. This aspect is available as the "Flickit"™ seal from Momar Industries, 645 Edison Way, Reno, Nev.

While not wishing to be bound by theory, it is believed that regarding asymmetrical sealing membranes the induction energy used during the sealing process tends to follow the rim of the foil and not along the mass of the container rim. Accordingly, the energy available for sealing is substantially diminished at the container/seal juncture in the region of the asymmetry. This leads to increased seal failures, with concomitant increases in product leakage and spoilage.

FIG. 8 is a cross-sectional diagram depicting the employment of a heat-sealable membrane incorporating an alternate removal feature and a cap seal within a container cap. Membrane 800 is deployed for sealing a container 210. Membrane 800 includes a polyethylene layer 802 laminated to a 1 to 3 mil PET or polyester layer 806 with adhesive layer 804. This in turn is laminated to a co-ex sealing layer 810 with another adhesive layer 808. Adhesive layers 804 and 808 may be implemented with a number of adhesive products, including the previously discussed Liofol® UR2780/UR5891 adhesive system. Membrane 800 is formed with an asymmetry, for instance a tab 812. Tab 812 provides a convenient removal feature for removing membrane 800 from container 210. It should be noted that there is no foil layer in membrane 800, nor in tab 812 thereof. Instead, the foil used for induction sealing is formed as part of cap seal 820. In this embodiment, cap seal 820 used in operative combination with membrane 800 is formed of 0.5 to 2.0 mil aluminum foil layer 822 laminated to a polyethylene layer 824. This lamination may be performed with standard lamination equipment implementing the previously discussed Liofol® UR2780/UR5891 adhesive system or the like.

This implementation provides a convenient pull tab to remove peelable membrane 800, while it avoids the previously discussed problem of induction energy applied to asymmetrical foils. Again, not wishing to be bound by theory, it is believed that this is due to the fact that while membrane 800 is itself asymmetrical, foil layer 822 of the cap seal is substantially symmetrical with respect to the geometry of the rim of container 210. Foil layer 822, heated upon the application of induction energy, heats membrane 800 as previously discussed, and enhances the seal between membrane 800 and container 210, without the aforementioned problems with reduced seal energy and integrity at tab 812.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners, as noted.

The invention claimed is:

1. A heat-sealed, peelable lidding membrane for retort packaging comprising:
   a top layer wherein said top layer prevents tearing of said membrane during removal from a container;
   a foil layer laminated to said top layer with a first adhesive layer;
   a co-extruded layer affixed directly to said foil layer with a second adhesive layer, said co-extruded layer having a plastic body co-extruded with a heat-sealable sealing resin layer, wherein said heat-sealable sealing resin layer is adapted to sealingly engage a container rim surrounding a container opening; and
   wherein said co-extruded plastic body of said co-extruded layer has a low density polyethylene layer and a linear medium-density polyethylene layer, wherein said low density polyethylene layer is co-extruded between said co-extruded linear medium-density polyethylene layer and said co-extruded heat-sealable sealing resin layer, wherein said plastic body of said co-extruded layer prevents tearing of said co-extruded layer and causes fracture and delamination of said heat-sealable sealing resin layer from said container rim when said heat-sealed peelable lidding membrane is removed from said container rim.

2. The membrane of claim 1, wherein said top layer is a plastic layer.

3. The membrane of claim 2, wherein said plastic layer is a polyethylene terephthalate or a polyester.

4. The membrane of claim 1, wherein said first adhesive layer is a polyurethane based adhesive cured with an isocyanate based curing agent.

5. The membrane of claim 1, wherein said foil layer being aluminum foil.

6. The membrane of claim 1, wherein said second adhesive being a polyurethane based adhesive cured with an isocyanate based curing agent.

7. The membrane of claim 1, wherein said top layer being a layer of relatively stiff material.

8. The membrane of claim 7, wherein said stiff material being a paper, a cardboard, a plastic, or a composite thereof.

9. The membrane of claim 7, wherein said stiff material is a layer of talc-filled polypropylene.

10. The membrane of claim 1 including a transparent layer adhesively secured to said top layer.

11. The membrane of claim 10, wherein said top layer includes an ink layer.

12. A combination of a cap and a container for retort processing of a package comprising:
   a cap adapted to be received by a container neck of said container, said cap having a cap seal including a plastic layer and an elastomer layer;
   said container having a heat sealed, peelable lidding membrane covering an opening in said container neck, said membrane including a top layer, a foil layer laminated to said top layer with a first adhesive layer, and a co-extruded layer affixed directly to said foil layer with a second adhesive layer, said co-extruded layer having a plastic body co-extruded with a heat sealable sealing resin layer, wherein said heat sealable sealing resin layer engages a rim surrounding said opening in said container neck; and
   wherein said co-extruded plastic body of said co-extruded layer has a low density polyethylene layer and a linear medium-density polyethylene layer, wherein said low density polyethylene layer is co-extruded between said co-extruded linear medium-density polyethylene layer and said co-extruded heat-sealable sealing resin layer, wherein said co-extruded plastic body of said co-extruded layer prevents tearing of said co-extruded layer and causes fracture and delamination of said heat-sealable sealing resin layer from said rim of said container opening.

13. The combination of claim 12, wherein said top layer is a second plastic layer.

14. The combination of claim 13, wherein said second plastic layer is a polyethylene terephthalate or a polyester.

15. The combination of claim 12, wherein said first adhesive layer is a polyurethane based adhesive cured with an isocyanate based curing agent.

16. The combination of claim 12, wherein said foil layer being aluminum foil.

17. The combination of claim 12, wherein said second adhesive being a polyurethane based adhesive cured with an isocyanate based curing agent.

18. The combination of claim 12, wherein said top layer being a layer of relatively stiff material.

19. The combination of claim 18, wherein said stiff material being a paper, a cardboard, a plastic or a composite thereof.

20. The combination of claim 18, wherein said stiff material is a layer of talc-filled polypropylene.

21. The combination of claim 12, including a transparent layer adhesively secured to said top layer.

22. The combination of claim 21, wherein said top layer includes an ink layer.

23. A heat-sealed, peelable lidding membrane for retort packaging including a sealant layer structure comprising:
- a top layer wherein said top layer prevents tearing of said membrane during removal from a container, a foil layer laminated to said top layer with a first adhesive layer, and a co-extruded layer affixed directly to said foil layer with a second adhesive layer;
- said co-extruded layer including a plastic body and a sealant layer, said sealant layer bondable to a container lip of said container with a strength sufficient to allow said sealant layer to remain with said container when the membrane is peeled free from said container lip;
- said sealant layer being capable of tearing at the periphery of said container lip when the membrane is peeled free from said container lip; and
- said plastic body of said co-extruded layer has a low density polyethylene layer and a linear medium-density polyethylene layer, wherein said low density polyethylene layer is co-extruded between said co-extruded linear medium-density polyethylene layer and said co-extruded sealant layer, said plastic body co-extrusion bonded to said sealant layer with a strength sufficient to fracture said sealant layer at or near the periphery of said container lip during peeling of said complete membrane and delaminates from said sealant layer adjacent said container lip, said plastic body of said co-extruded layer having a tear resistance sufficient to achieve fracture and delamination of said sealing resin layer from said container lip.

24. The heat-sealed, peelable lidding membrane for retort packaging of claim 23 wherein said sealant layer is colored.

25. The heat-sealed, peelable lidding membrane for retort packaging of claim 23 wherein the peel force is from about 2 to 6 pounds.

26. The heat-sealed, peelable lidding membrane for retort packaging of claim 23 wherein said top layer is a polyethylene terephthalate or polyester layer.

27. The heat-sealed peelable lidding membrane for retort packaging of claim 26 wherein said polyethylene terephthalate or polyester layer includes at least one pull tab.

28. The heat-sealed, peelable lidding membrane for retort packaging of claim 23 wherein said top layer includes at least one pull tab.

29. The heat-sealed, peelable lidding membrane for retort packaging of claim 23 wherein said top layer is stiff enough for said peelable membrane to be removed without the use of a pinching grip motion.

30. The heat-sealed, peelable lidding membrane for retort packaging of claim 23 wherein said first adhesive layer or said second adhesive layer is a solventless adhesive.

31. The heat-sealed, peelable lidding membrane for retort packaging of claim 23 further comprising a secondary resilient backup structure, said secondary resilient backup structure being separate and not bonded to the rest of the peelable membrane structure, said secondary resilient backup structure may be a homogeneous material or include multiple layers coextruded or adhesive bonded together, said secondary structure may be separated from or integral with a closure and is flexible and resilient.

32. The membrane of claim 1, wherein said first adhesive or said second adhesive is a solventless adhesive.

33. The heat-sealed, peelable lidding membrane for retort packaging of claim 23 wherein said top layer is a layer of relatively stiff material.

34. The heat-sealed, peelable lidding membrane for retort packaging of claim 33 wherein said stiff material is a paper, a cardboard, a plastic or a composite thereof.

35. The heat-sealed, peelable lidding membrane for retort packaging of claim 33 wherein said stiff material is a layer of talc-filled polypropylene.

* * * * *